US008855358B2

(12) United States Patent
Fridrich et al.

(10) Patent No.: US 8,855,358 B2
(45) Date of Patent: Oct. 7, 2014

(54) DETERMINING WHETHER OR NOT A DIGITAL IMAGE HAS BEEN TAMPERED WITH

(75) Inventors: Jessica Fridrich, Vestal, NY (US); Miroslav Goljan, Vestal, NY (US); Jan Lukas, Johnson City, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 95 days.

(21) Appl. No.: 13/447,648

(22) Filed: Apr. 16, 2012

(65) Prior Publication Data

US 2012/0230536 A1 Sep. 13, 2012

Related U.S. Application Data

(63) Continuation of application No. 11/437,187, filed on May 19, 2006, now Pat. No. 8,160,293.

(51) Int. Cl.
*G06K 9/00* (2006.01)
*G06K 9/36* (2006.01)
*G06K 9/40* (2006.01)

(52) U.S. Cl.
CPC .............. *G06K 9/40* (2013.01); *G06K 9/00899* (2013.01)
USPC .......................................... 382/100; 382/286

(58) Field of Classification Search
CPC ................................... H04N 1/0088

USPC .......................................................... 382/100
See application file for complete search history.

(56) References Cited

U.S. PATENT DOCUMENTS

| 6,633,653 | B1 * | 10/2003 | Hobson et al. ................. 382/100 |
| 7,663,670 | B1 * | 2/2010 | Orboubadian ............. 348/231.2 |
| 2005/0053239 | A1 * | 3/2005 | Nomizu et al. ............... 380/220 |
| 2006/0020830 | A1 * | 1/2006 | Roberts ......................... 713/194 |

OTHER PUBLICATIONS

Lukas et al., "Determining digital image origin using sensor imperfections", Image and VIdeo Communications and Processing 2005, published online Apr. 6, 2005.*
Hartung et al., "Spread spectrum watermarking: malicious attacks and counterattacks", Proc. SPIE 3657, Security and Watermarking of Multimedia Contents, 147 (Apr. 9, 1999).*

* cited by examiner

*Primary Examiner* — Anand Bhatnagar
*Assistant Examiner* — Soo Park
(74) *Attorney, Agent, or Firm* — Steven M. Hoffberg; Ostrolenk Faber LLP

(57) ABSTRACT

Apparatus and method to verify the integrity of a digital image (i.e., deciding whether or not the entire image or just a portion has been tampered with, and/or finding the doctored area in the image). One first determines the imaging sensor's reference pattern noise, which serves as a unique fingerprint that identifies the imaging sensor that captured the image. To verify the integrity of the content in a region of the image, a correlation detector determines the presence or absence of the imaging sensor's reference pattern noise in that region, thereby verifying whether or not the image has integrity. The correlation detector can also find automatically one or more regions in the image that were tampered with.

20 Claims, 5 Drawing Sheets

```
R  G  R  G  R
G  B  G  B  G
R  G  R  G  R
G  B  G  B  G
```

Figure 2: Bayer color filter array.

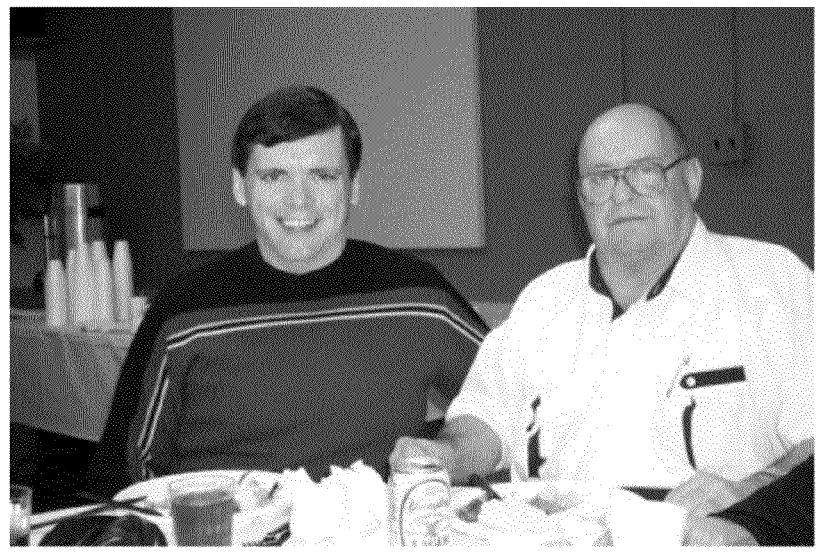
Figure 3: Forged digital image, the head of the person on the left was taken from a different image and the result was saved in the JPEG format.

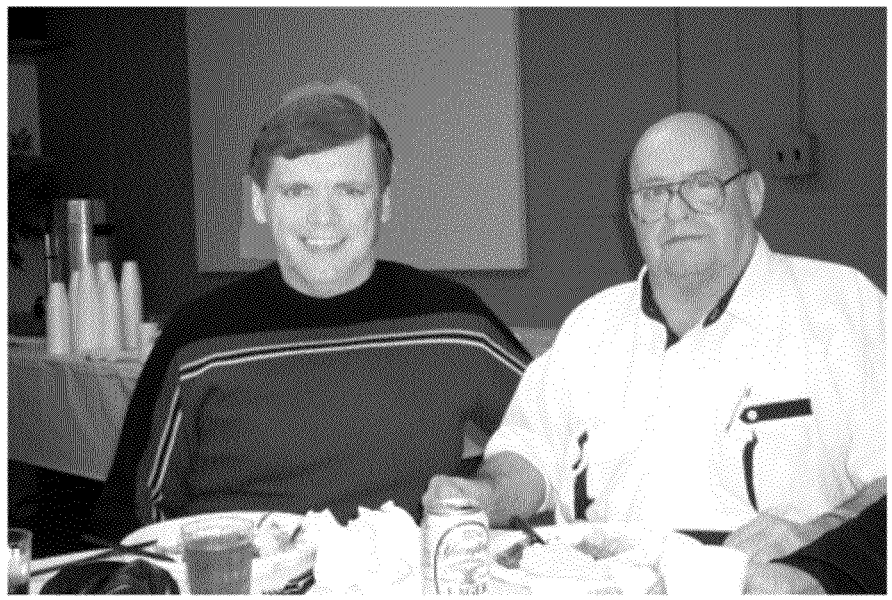
Figure 5: Area with low pattern noise presence exposed.

DETERMINING WHETHER OR NOT A DIGITAL IMAGE HAS BEEN TAMPERED WITH

CROSS REFERENCE TO RELATED APPLICATIONS

The present application is a Continuation of U.S. patent application Ser. No. 11/437,187, filed May 19, 2006, now U.S. Pat. No. 8,160,293, issued Apr. 17, 2012, the entirety of which is expressly incorporated herein by reference.

STATEMENT OF GOVERNMENT INTEREST

This invention was made with Government support under F30602-02-2-0093 from the U.S. Air Force. The Government has certain rights in the invention.

BACKGROUND OF THE INVENTION

Forging a photograph is probably as old as the art of photography itself. There exist forensic methods for exposing forgeries of analog pictures. However, digital photography and powerful software to edit an image make it very easy, even for a non-specialist, to create a believable forgery of a digital photograph. As digital photography continues to replace analog, there is an urgent need to detect reliably whether a digital image has been doctored. Verifying the content of a digital image or identifying a forged segment would be useful, for example in a court of law when a digital photograph is presented as evidence.

Several different methods for detecting digital forgeries have been proposed. T. T. Ng and S. H. Chang proposed a method for detection of photomontages ("Blind Detection of Digital Photomontages using Higher Order Statistics", *ADVENT Technical Report* #201-2004-1, Columbia University, June 2004). A. C. Popescu and H. Farid: developed several methods for identifying digital forgeries by tracing artifacts introduced by resampling ("Exposing Digital Forgeries by Detecting Traces of Resampling", 53 *IEEE Transactions on Signal Processing*, February 2005) and Color Filter Array (CFA) interpolation ("Exposing Digital Forgeries in Color Filter Array Interpolated Images", *IEEE Transactions on Signal Processing*, 2005 (in press)). Recently, M. K. Johnson and H. Farid proposed another method based on inspecting inconsistencies in lighting conditions ("Exposing Digital Forgeries by Detecting Inconsistencies in Lighting", *Proc. ACM Multimedia and Security Workshop*, New York, 2005.). J. Fridrich, D. Soukal, and J. Lukáš ("Detection of Copy-Move Forgery in Digital Images", *Proc. Digital Forensic Research Workshop*, Cleveland, Ohio, August 2003.) established a method for detecting copy-move forgeries; a similar method was later proposed by Popescu and Farid ("Exposing Digital Forgeries by Detecting Duplicated Image Regions", *Technical Report*, TR2004-515, Dartmouth College, Computer Science 2004.).

For each of these methods, there are circumstances when they will fail to detect a forgery. Ng's and Chang's photomontages detection method, for instance, has very restrictive assumptions that are usually not fulfilled. Even when they are, the method has a misclassification rate of about 28% ("Blind Detection of Digital Photomontages using Higher Order Statistics", *ADVENT Technical Report* #201-2004-1, Columbia University, June 2004, page 34). The method of detecting copy-move forgery is limited to one particular kind of forgery, where a certain part of an image is copied and pasted somewhere else in the same image (e.g., to cover an object). Methods based on detecting traces of resampling may produce less reliable results for processed images stored in JPEG format. The method based on detection of inconsistencies in lighting assumes nearly Lambertian surfaces for both the forged and the original areas. It might fail to work when the object does not have a compatible surface, when pictures of both the original and forged objects were taken under similar lighting conditions, or during a cloudy day when no directional light source is present. In particular, none of these prior-art methods uses the pattern noise of the imaging sensor. Thus there is a need for apparatus and method that overcome the drawbacks of the prior art in detecting digital forgeries.

OBJECTS AND SUMMARY OF THE INVENTION

The object of the present invention is to overcome the drawbacks of the prior art.

A further object of the present invention is to verify simply, reliably, and robustly the content integrity of a digital image whether or not that content has been changed.

Another object of the present invention is to make use of the reference pattern noise of the digital imaging device's sensor to determine whether or not a particular digital image has been tampered with.

Briefly stated, the present invention provides apparatus and method to verify the integrity of a digital image (i.e., deciding whether or not the entire image or just a portion has been tampered with, and/or finding the doctored area in the image). One first determines the imaging sensor's reference pattern noise, which serves as a unique fingerprint that identifies the imaging sensor that captured the image. To verify the integrity of the content in a region of the image, a correlation detector determines the presence or absence of the imaging sensor's reference pattern noise in that region, thereby verifying whether or not the image has integrity. The correlation detector can also find automatically one or more regions in the image that were tampered with.

According to an embodiment of the invention, a method for determining whether or not at least one digital image, obtained by a particular digital imaging sensor, has been tampered with, comprises the steps of: determining a reference noise pattern for the particular digital imaging sensor; searching the at least one digital image for the reference noise pattern; and identifying presence or absence of the reference noise pattern in at least one portion of the at least one digital image, whereby absence of the reference noise pattern identifies the digital image as having been tampered with.

According to a feature of the invention, apparatus for determining whether or not at least one digital image, obtained by a particular digital imaging sensor, has been tampered with, comprises: means for determining a reference noise pattern for the particular digital imaging sensor; means for searching the at least one digital image for the reference noise pattern; and means for identifying presence or absence of the reference noise pattern in at least one portion of the at least one digital image, whereby absence of the reference noise pattern identifies the digital image as having been tampered with.

According to another feature of the invention, a computer-readable storage medium embodies program instructions for a method of determining a reference noise pattern for a particular digital imaging sensor; searching at least one digital image, captured by the particular digital imaging sensor, for the reference noise pattern; and identifying presence or absence of the reference noise pattern in at least one portion of the at least one digital image, whereby absence of the reference noise pattern identifies the digital image as having been tampered with.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is an example of a color filter array (CFA).

FIG. 3 is a photograph that has been tampered with.

FIG. 5 shows the doctored region of FIG. 3 detected by the technique of the present invention.

DETAILED DESCRIPTION OF THE PREFERRED EMBODIMENT

The technique of the present invention uses the pattern noise of imaging sensors that is caused by slight imperfections in the manufacturing of every imaging sensor. This pattern noise is present in all types of imaging sensors (CCD, CMOS, NMOS, JFET) in current use. The pattern noise is automatically and inevitably superimposed onto each image acquired by a particular sensor, similar to the way in which a gun barrel imposes specific scratches on a bullet fired from that gun.

Figure 1:
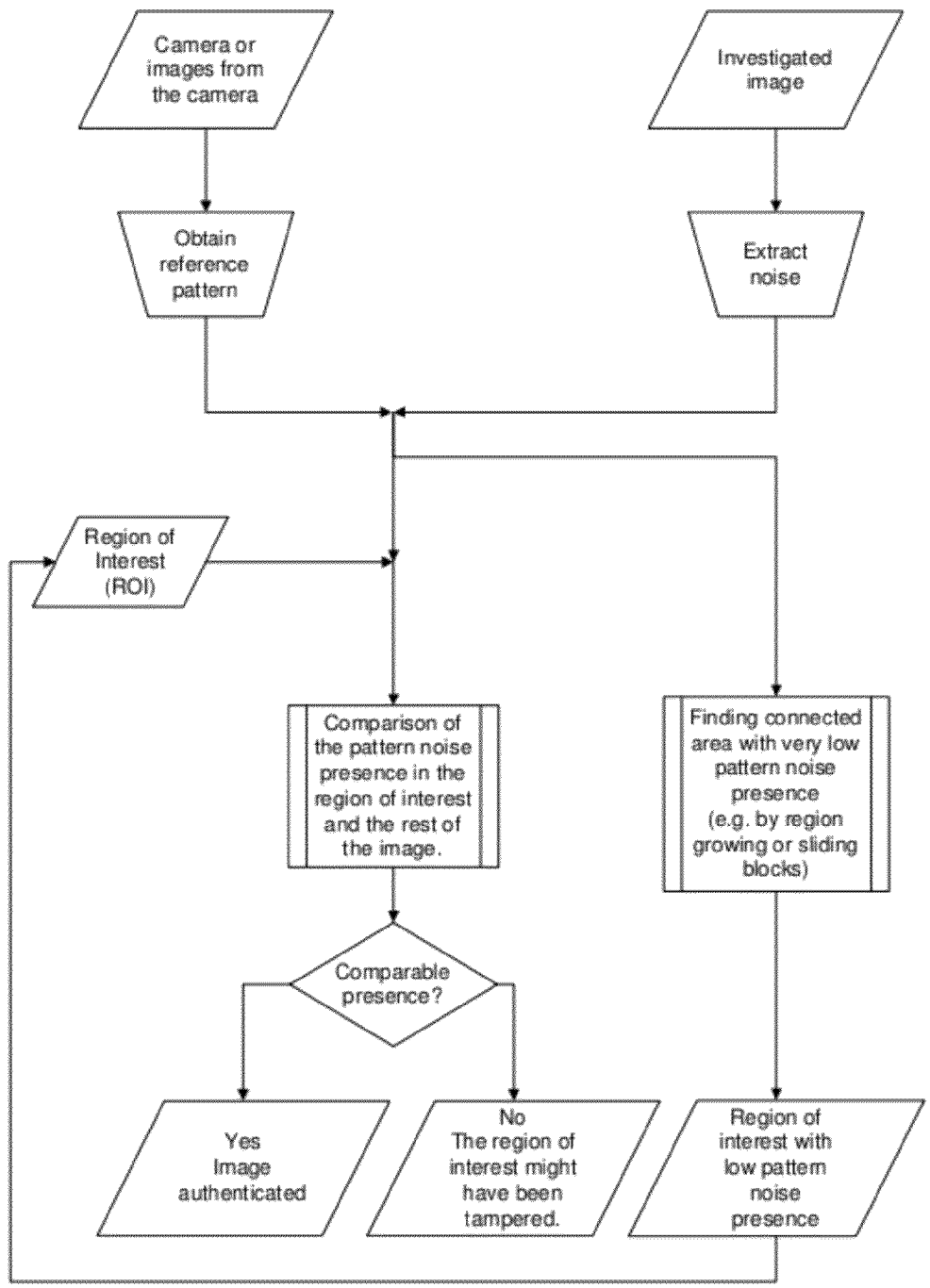
FIG. 1 is a flow chart of the general scheme of the present invention.

Referring to FIG. 1, the present invention offers two different embodiments of the technique. The first embodiment uses the sensor's pattern noise to determine whether, in the image under examination, a given suspicious area is authentic. The second embodiment uses the sensor's pattern noise to find areas in the image that lack the pattern noise, thus indicating suspicious areas to be verified by the first embodiment. For both embodiments, we need either to examine the imaging device that captured the image in question or to have sufficiently many images captured by that device to determine its pattern noise approximately. Therefore, in the first step of the present invention, we obtain an approximation to the pattern noise of the imaging device, that is, the device's reference pattern. There are several ways to obtain the imaging device's reference pattern, some of which require the device to be available to the investigator.

In a typical consumer digital camera, before the light from the imaged scene reaches a photoresponsive sensor, it passes through the camera's lens, an antialiasing (blurring) filter, and then through a color filter array (CFA). (Some rare cameras do not use a CFA; e.g., cameras with the Foveon™ X3 sensor or cameras with three sensors.) The sensor converts photon counts to voltages, which are subsequently quantized in an A/D converter. This digital signal is interpolated (demosaicked) using color interpolation algorithms (if the sensor uses a CFA). The digital signal is then further processed using color correction and white balance adjustment. Additional processing includes filtering and gamma correction to adjust for the linear response of the imaging sensor. Finally, the resulting digital image is written to the camera memory device in a user-selected image format. This may require additional processing, such as JPEG compression. Other imaging devices, such as a scanner, work in a similar way.

The imaging sensor is a device that converts light into an electrical signal. Currently, there are two types of sensors that are used most frequently. These are CCD (charge-coupled device) and CMOS (complementary metal-oxide semiconductor) sensors. CCDs dominate amateur class cameras; they are also used in some semi-professional DSLRs. CMOS sensors are used either in low-end cameras, such as cell-phone cameras, or high-end DSLRs. There are also cameras on the market that use NMOS sensor (Olympus Evolt E330 amateur class DSLR), JFET sensors (Nikon D2H and D2Hs professional DSLRs), or the Foveon™ X3 sensor (Sigma SD9 and SD10 semi-professional DSLRs); the latter is also based on CMOS technology.

To process the picture, the sensor is divided into very small, minimally addressable picture elements (pixels) that collect photons and transform them into voltages. The Foveon™ X3 sensor is the only sensor that can capture all three basic colors at every pixel. All other types of sensors capture only one particular basic color at any single pixel. Either the imaging device uses sensors that capture all three color components (red, green, and blue for the RGB color model), or the sensor uses CFA and interpolates the remaining colors. A number of different interpolation algorithms exist for each CFA. The CFA assigns each pixel the appropriate color for it to capture. There are many types of CFAs, each based on a different color model. Referring to FIG. 2, one frequently used CFA is based on the RGB color model as shown.

The interpolated signal from the imaging device's sensor is further processed nonlinearly inside the camera. The imaging device's pattern noise (also referred to as pixel noise or pixel non-uniformity) is defined (see G. C. Hoist, *CCD Arrays, Cameras, and Displays*, $2^{nd}$ edition, JCD Publishing & SPIE Press, USA, 1998) as the noise component that is not reduced by frame averaging. Two main components of pattern noise are fixed pattern noise and photo response non-uniformity noise. Pattern noise may also comprise in part some artifacts of processing, e.g., CFA interpolation artifacts. Since the pattern noise does not change from image to image and is relatively stable over the device's life and a reasonable range of conditions (e.g., temperature), it can identify the imaging device.

There are also a number of random noise sources in digital images introduced by imaging devices, such as shot noise, dark current shot noise, circuit noise, etc. (Hoist, *CCD Arrays, Cameras, and Displays*; J. R. Janesick, *Scientific Charge-Coupled Devices*, SPIE PRESS Monograph, vol. PM83, SPIE—The International Society for Optical Engineering, January, 2001). These random components vary from image to image and therefore cannot identify the imaging device.

If an imaging sensor takes a picture of a scene lit absolutely evenly, the resulting digital image will still exhibit small changes in intensity between individual pixels. This is partly because of the shot noise, a random component, and partly because of the pattern noise—a component that (as previously mentioned) is approximately the same for each image. The irregularities between pixels that are responsible for the main part of the pattern noise are introduced during the manufacturing process. It is probably impossible to build an imaging sensor without pattern noise, since semiconductor devices (or microelectronic devices generally) are never made exactly according to specifications but always within a given tolerance. In fact, every pixel on the imaging sensor is a semiconductor device, and thus each pixel has slightly different characteristics. The pattern noise is also influenced by the clock bias (Janesick, *Scientific Charge-Coupled Devices*). The magnitude of the pattern noise is typically of the order of several percent, measured by photon transfer, and it varies for different sensors.

The part of the pattern noise caused by dark currents is called the fixed pattern noise (FPN). When the sensor is not exposed to light, it is not expected to collect any charge. However, dark currents cause the electrons to accumulate in pixels, and thus the sensor does collect a charge. This charge comprises a random part (the dark current shot noise) and a fixed, sensor-specific part (FPN). Obviously, the FPN is an additive noise; and thus it can be corrected for by subtraction of dark frame ("Dark Frame Subtraction", Qimage help, www.ddisoftware.com/qimage/qimagehlp/dark.htm), a reference pattern usually obtained by averaging dark images (covered lenses) obtained with a similar shutter (or scanning) speed and at a similar temperature as the image. Denoting the raw image as X and the dark frame as D, the FPN correction is X→X−D. Some middle to high-end consumer cameras automatically subtract the dark frame, either every time the camera is turned on, or when the user activates this function. Cheaper cameras may not perform this step.

The dominant part of the pattern noise is called the photo-response non-uniformity noise (PRNU). It is caused mainly by pixel non-uniformity, a signal primarily concentrated in high or medium-high spatial frequencies. The pixel non-uniformity is caused by imperfect manufacturing of the sensor, resulting in a pixel's varying sensitivity to light. Refraction of light on dust particles, on optical surfaces, and the sensor itself are low frequency signals that also contribute to the PRNU noise. Because these low-frequency patterns are likely to be time dependent and influenced by zoom settings, in the present invention we only use the high-medium spatial frequency portion of the PRNU noise caused by pixel non-uniformity.

The linear response of sensors enables a simple correction of PRNU using a process called flat fielding (Hoist, CCD Arrays, Cameras, and Displays; Janesick, Scientific Charge-Coupled Devices), in which the image is divided by a normalized reference pattern extracted from a uniformly lit scene. Hoist suggests that simple images of uniform blue sky should be sufficient for this purpose. Denoting the flat-fielding frame F, the noise correction (including the dark frame subtraction) is expressed as X<(X−D)/F. This correction must be applied before any further nonlinear image processing be performed. Fortunately, most consumer cameras do not flat-field their images, because it is not simple to achieve uniform illumination of the sensor inside the camera. It is mainly the PRNU noise that we use to identify the imaging device.

Essentially all imaging sensors (CCD, CMOS, NMOS, JFET, or CMOS-Foveon™ X3) are built from semiconductors, so the methods of manufacturing do not differ very much. Therefore, the pattern noise in all these sensors should have similar properties. Although Hoist and Janesick deal mainly with CCDs, Hoist notes (page 92) that CMOS sensors also experience both FPN and PRNU. As JFET and NMOS sensors do not fundamentally differ from CMOSs, they behave similarly. Our experiments with the CMOS-Foveon™ X3 based Sigma SD9 confirm the presence of pattern noise that survives frame averaging and therefore can be used for detection of forgeries.

In the preferred embodiments, we obtain the device's reference pattern (an approximation to its pattern noise) $P_C$ by averaging, with a denoising filter, the noise extracted from multiple images. Averaging eliminates the influence of particular scenes and the effect of random noise on the output of the denoising filter. The more images are used, the more accurate the approximation to the pattern noise becomes. Only the pattern noise survives frame averaging, thus enabling a more reliable identification. For this embodiment, we recommend using about 300 images of natural scenes; about 50 images is the recommended minimum. This technique does not require that the imaging device be in the possession of the investigator. Only images (raw or compressed) from the imaging device are necessary. This technique is applicable to all cameras, whether video or still, and other devices that acquire images, such as scanners.

Another way to calculate the reference pattern is to use dark frame subtraction ("Dark Frame Subtraction") and flat fielding (see Holst, CCD Arrays, Cameras, and Displays; Janesick, Scientific Charge-Coupled Devices). Both actions must be performed on the raw sensor data before demosaicking and other in-camera processing. Most consumer-end cameras, however, do not have an option to output this raw data. Moreover, even when the camera has such an option, the raw-format specifications are usually proprietary, requiring reverse-engineering the format. Also, the flat field must be obtained with the same focal length and exposure as the image being flat-fielded. These requirements make the task of performing flat fielding somewhat difficult and elaborate.

Other methods exist for obtaining the imaging device's reference pattern. For example, one might extract the noise from a single blue-sky image as the device's reference pattern. In this case, however, the performance of the technique of the present invention appears to worsen.

To detect a local similarity between the imaging device's reference pattern and the noise from an image being investigated, we first extract the noise from the image. Generally, we use a denoising filter to extract the noise from the image. Let's denote the filter as $F_o$. Denoting by Y and $F_o(Y)$ the spatial representation of the image and its denoised version, we work with the difference signal $Y-F_o(Y)$, which we take as an approximation to the pattern noise contained in the image.

There are many image denoising filters. The best results would come from a filter matched to a pattern noise. But the construction of such a filter is not trivial, and it may not even be possible. Generally, the purpose of the denoising filter is to obtain an approximation as close as possible to the device's pattern noise by removing the influence of the image's scene. This step improves the signal-to-noise ratio (SNR) between the device's pattern noise (the signal being detected) and the scene (the image). We recommend using a general-purpose denoising filter as described by M. K. Mihcak, I. Kozintsev, and K. Ramchandran ("Spatially adaptive statistical modeling of wavelet image coefficients and its application to denoising," 6 Proc. IEEE Int. Conf. Acoustics, Speech, and Signal Processing (Phoenix, Ariz., March 1999) 3253-3256). This filter extracts from the questioned image a Gaussian noise with known variance $\sigma^2$ (an input parameter to the filter), based on the assumption that, in the wavelet domain, the image and the noise form an additive mixture of a non-stationary Gaussian signal and a stationary Gaussian signal with a known variance $\sigma$. We found from experiments that the performance of our technique is not very sensitive to the filter parameter $\sigma$, so long as $\sigma>1$. The value $\sigma=2-5$ gives the best overall performance across all devices.

Other common denoising filters, such as a median filter, can be used in the technique of the present invention. However, the filter described above gave the best performance in our tests.

In the first embodiment of the technique of the present invention, we correlate the extracted noise, from the image under examination, with the device's reference pattern, both from the region of interest only. We then compare the numerical value of this correlation to correlations obtained from other regions, of the same size and shape, different from the region of interest and randomly spread across the entire image. The numerical values of all correlations are then interpreted to reach a conclusion whether or not the correlation in the region of interest is an outlier.

The correlation $\rho_C$ between the image noise $Y-F_o(Y)$ with the imaging device's reference noise pattern $P_C$ is calculated according to the following formula:

$$\rho_C(Y) = \qquad (1)$$
$$\mathrm{corr}(Y - F_\sigma(Y), P_C) = \frac{Y - F_\sigma(Y) - E\{Y - F_\sigma(Y)\}) \cdot (P_C - E\{P_C\})}{\|Y - F_\sigma(Y) - E\{Y - F_\sigma(Y)\}\|\|P_C E\{P_C\}\|},$$

where $E\{\ \}$ stands for the mean value.

When computing correlation in a given area A of the image, we work only with the part of the noise that corresponds to the area A: $Y_A-F_o(Y_A)$, as well as with the corresponding part of the pattern noise: $P_{C|A}$. The formula (I) has now the form:

$$\rho_C(Y_A) = \mathrm{corr}(Y_A - F_\sigma(Y_A), P_{C|A}) = \qquad (2)$$
$$\frac{Y_A - F_\sigma(Y_A) - E\{Y_A - F_\sigma(Y_A)\}) \cdot (P_{C|A} - E\{P_{C|A}\})}{\|Y_A - F_\sigma(Y_A) - E\{Y_A - F_\sigma(Y_A)\}\|\|P_{C|A} E\{P_{C|A}\}\|}.$$

The second embodiment of the technique of the present invention does not use any a priori information about the location of the presumably forged region in the image under examination. This embodiment can find the region automatically, for instance, by sliding fixed-size blocks, or by region growing, etc.

Both embodiments of the technique of the present invention are relatively easy to implement. They work for images obtained with any digital imaging sensor, and they are robust to image degradation including, e.g., lossy (usually JPEG) compression, image processing, down sampling (resizing), or a combination of these forms of image degradation. Before using the technique of the present invention, one must first correct for resampling, because it desynchronizes the device's reference pattern with the image noise. Resynchronizing is usually easy to do because we know the "native" image size determined by the device sensor under investigation.

Referring to FIG. 3, the owner of this image (person on the left) did not like the way his face appeared in the image. So he created a forgery, replacing his head by pasting from another image of the same scene taken by the same camera (Kodak DC290) a few seconds later. The result was saved in JPEG format with a non-standard JPEG quantization matrix. Taking into account only the four lowest-frequency DCT coefficients, the matrix is closest to a standard quantization table with a quality factor of 64 or 65.

Figure 4:
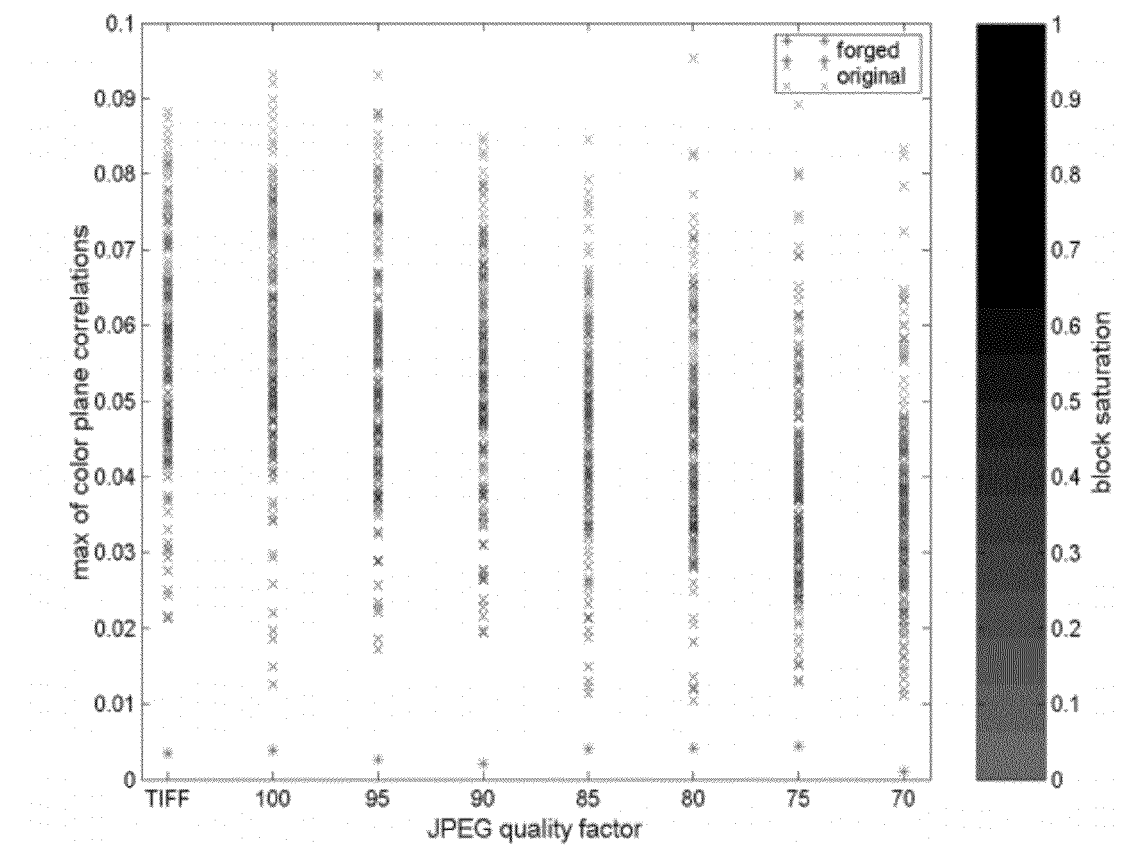
FIG. 4 shows the correlations between the noise from the image of FIG. 3 and the device's reference pattern noise for different quality factors of JPEG image compression.

The reference pattern for the camera was computed by noise averaging using approximately 300 full-camera resolution images in TIFF format (1792×1200). To show the capabilities of the first embodiment of the present invention (verifying the content integrity of the region of interest), we first selected the tampered head (our region of interest or ROI) manually using a mouse. Then we applied authentication: correlations between the noise from the image and the camera reference pattern were computed in the ROI and in 200 regions of the same size and shape randomly located across the image. These correlations were repeated after recompressing the forged image by JPEG compression with quality factors ranging from 70 to 100 (to show that detecting the forgery does not degrade significantly with compression). FIG. 4 shows the correlations for different JPEG quality factors. The saturation in each region is indicated by the darkness of the symbol. Completely dark (=black) indicates fully saturated regions where low values of the correlation $\rho$ are expected. Less dark corresponds to regions with no saturation. We can see that the ROI does not contain any saturated areas. At the same time, the correlation value for the ROI is much lower than for any other segment in the image. It is therefore a clear outlier, indicating that the ROI has been tampered with. Note that this same conclusion can be reached even after the forged image has been compressed with relatively low quality factors.

As an example of the second embodiment of the present invention, we have computed correlations in partially overlapping blocks across entire image. We have used 16 types of overlapping blocks, each with different size and shape. Referring to FIG. 5, we see the region detected as having a low presence of the reference pattern noise (marked by the lighter color) matches well the tampered-with head.

The technique of the present invention is limited where parts of images lack the device's reference pattern noise (e.g., very dark or completely saturated regions) or where it is difficult to extract (highly textured regions). However, our experience is that, in typical images, even correlations in such regions are usually larger than in doctored areas, where the device's reference pattern noise is completely absent.

Geometrical transformations of images, such as rotation, cropping, resizing, continuous digital zoom, or fish-eye lens processing, complicate the technique of the present invention, as they require proper synchronization between the image noise and the device's reference pattern. As such transformations cause desynchronization, they must be corrected for prior to calculating the correlation.

Can the technique of the present invention be fooled by an attacker? A simple denoising of the image with a denoising filter will not remove the pattern noise. However, it is known from robust watermarking (see I. Cox, M. L. Miller, and J. A. Bloom, *Digital Watermarking*, Morgan Kaufmann, San Francisco, 2001) that, when the attacker knows the watermark, he or she can remove it or plant it in a different image (M. Kutter, M., S. Voloshynovskiy, and A. Herrigel, "The Watermark Copy Attack," 3971 *Proc. SPIE Electronic Imaging, Security and Watermarking of Multimedia Content II*, San Jose, Calif., 2000, pp. 371-380). In our case, if the attacker possesses enough skill in signal processing and has either access to the camera or has sufficiently many images from it, he can perform malicious processing, thus fooling verification of the image's integrity. The sensor's pattern noise thus essentially plays the role of a secret key. Though any technique of verifying content integrity one can devise can be compromised by a sufficiently sophisticated opponent with access to important information, we believe the technique of the present invention is unlikely to be defeated in the normal course of events.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for detecting a tampered digital image; comprising:

determining a reference noise pattern, wherein the reference noise pattern is pixel non-uniformity imperfections of a digital imaging sensor which created an authentic version of the digital image;

regionally correlating the reference noise pattern with the digital image, to determine a regional correlation for respective regions having the same size and shape;

detecting regions of the digital image which have been tampered based on at least identification of at least one region having an outlier correlation as compared to a plurality of other regions of the digital image; and outputting a signal corresponding to said detecting.

2. The method according to claim 1, wherein the other regions of the digital image are randomly spread across the entire image.

3. The method according to claim 1, wherein the respective correlations of the regions of the digital image and the reference noise pattern are compared numerically.

4. The method according to claim 1, wherein said determining further comprises examining the digital imaging sensor.

5. The method according to claim 1, wherein said determining further comprises obtaining a plurality of images created by the digital imaging sensor, and statistically analyzing the plurality of images.

6. The method according to claim 5, wherein said plurality of images comprises at least 50 of said digital images.

7. The method according to claim 1, wherein said determining comprises performing flat fielding to at least partially correct photoresponse non-uniformity noise of the digital imaging sensor to obtain said reference noise pattern.

8. The method according to claim 1, wherein said determining comprises performing dark frame subtraction to at least partially correct photoresponse non-uniformity noise of the digital imaging sensor to obtain said reference noise pattern.

9. The method according to claim 1, wherein said determining comprises averaging, with a denoising filter, noise extracted from a plurality of images obtained by the digital imaging sensor.

10. The method according to claim 1, wherein said detecting regions comprises calculating, for an area A of said at least one digital image, a correlation $\rho_C$ between image noise $Y_A - F_o(Y)$ and a portion $P_{CA}$ of said reference noise pattern $P_C$ by the formula:

$$\rho_C(Y_A) = \text{corr}(Y_A - F_\sigma(Y_A), P_{C|A}) = \frac{Y_A - F_\sigma(Y_A) - E\{Y_A - F_\sigma(Y_A)\}) \cdot (P_{C|A} - E\{P_{C|A}\})}{\|Y_A - F_\sigma(Y_A) - E\{Y_A - F_\sigma(Y_A)\}\|\|P_{C|A}E\{P_{C|A}\}\|}$$

where E{ } stands for the mean value.

11. A system for determining whether a digital image has been tampered; comprising:

an input port configured to receive at least one stored digital image and information sufficient to determine a reference noise pattern, wherein the reference noise pattern is pixel non-uniformity imperfections of a digital imaging sensor which created an authentic version of the digital image;

at least one processor configured to regionally correlate the reference noise pattern with the digital image, to determine a regional correlation for respective regions having the same size and shape, and to detect regions of the digital image which have been tampered based on at least identification of at least one region having an outlier correlation as compared to a plurality of other regions of the digital image; and an output port configured to communicate a signal corresponding to the detected regions.

12. The system according to claim 11, wherein the other regions of the digital image are randomly spread across the entire image.

13. The system according to claim 11, wherein the respective correlations of the regions of the digital image and the reference noise pattern are compared numerically.

14. The system according to claim 11, wherein said at least one processor is further configured to statistically analyze a plurality of images created by the digital imaging sensor.

15. The system according to claim 11, wherein said at least one processor is further configured to perform flat fielding to at least partially correct photoresponse non-uniformity noise of the digital imaging sensor to obtain said reference noise pattern.

16. The system according to claim 11, wherein said at least one processor is further configured to perform dark frame subtraction to at least partially correct photoresponse non-uniformity noise of the digital imaging sensor to obtain said reference noise pattern.

17. The system according to claim 11, wherein said at least one processor is further configured to implement a denoising filter, which averages noise extracted from a plurality of images obtained by the digital imaging sensor.

18. The system according to claim 11, wherein said at least one processor is further configured to calculate, for an area A of said at least one digital image, a correlation $\rho_C$ between image noise $Y_A - F_o(Y)$ and a portion $P_{CA}$ of said reference noise pattern $P_C$ by the formula:

$$\rho_C(Y_A) = \text{corr}(Y_A - F_\sigma(Y_A), P_{C|A}) = \frac{Y_A - F_\sigma(Y_A) - E\{Y_A - F_\sigma(Y_A)\}) \cdot (P_{C|A} - E\{P_{C|A}\})}{\|Y_A - F_\sigma(Y_A) - E\{Y_A - F_\sigma(Y_A)\}\|\|P_{C|A}E\{P_{C|A}\}\|}$$

where E{ } stands for the mean value.

19. A non-transitory tangible computer-readable storage medium containing computer readable instructions for controlling a processor to perform a method comprising:

determining a reference pixel non-uniformity noise pattern for a digital imaging sensor which created an authentic version of the digital image;

regionally correlating the reference pixel non-uniformity noise pattern with the digital image, to determine a regional correlation for respective regions having the same size and shape;

detecting regions of the digital image which have been tampered based on at least identification of at least one region having an outlier correlation as compared to a plurality of other regions of the digital image; and outputting a signal corresponding to said detecting.

20. The non-transitory tangible computer-readable storage medium according to claim 19, wherein said detecting regions comprises calculating, for an area A of said at least one digital image, a correlation $\rho_C$ between image noise $Y_A - F_o(Y)$ and a portion $P_{CA}$ of said reference pixel non-unifomity noise pattern $P_C$ by the formula:

$$\rho_C(Y_A) = \text{corr}(Y_A - F_\sigma(Y_A), P_{C|A}) = \frac{Y_A - F_\sigma(Y_A) - E\{Y_A - F_\sigma(Y_A)\}) \cdot (P_{C|A} - E\{P_{C|A}\})}{\|Y_A - F_\sigma(Y_A) - E\{Y_A - F_\sigma(Y_A)\}\|\|P_{C|A}E\{P_{C|A}\}\|}$$

where E{ } stands for the mean value.

* * * * *